United States Patent [19]

Primeaux, II

[11] Patent Number: 5,962,144
[45] Date of Patent: *Oct. 5, 1999

[54] POLYUREA ELASTOMER SYSTEMS WITH IMPROVED ADHESION TO SUBSTRATES

[75] Inventor: Dudley J. Primeaux, II, Elgin, Tex.

[73] Assignee: Huntsman Petrochemical Corporation, Austin, Tex.

[ * ] Notice: This patent is subject to a terminal disclaimer.

[21] Appl. No.: 09/054,979

[22] Filed: Apr. 3, 1998

Related U.S. Application Data

[63] Continuation of application No. 08/869,385, Jun. 5, 1997, Pat. No. 5,759,695.

[51] Int. Cl.⁶ ........................................... B32B 9/00
[52] U.S. Cl. ..................... 428/425.5; 428/425.8; 428/440; 427/333; 427/385.5; 427/388.4; 427/417; 427/407.1; 427/408; 427/409; 427/421; 427/426
[58] Field of Search ................................. 427/333, 385.5, 427/388.4, 417, 407.1, 409, 408, 421, 426; 428/425.5, 425.8, 440

[56] References Cited

U.S. PATENT DOCUMENTS 5,266,671  11/1993  Primeaux, II ............................. 528/68
5,442,034  8/1995  Primeaux, II ............................. 528/60
5,759,695  6/1998  Primeaux ............................. 428/425.5

OTHER PUBLICATIONS

"Water–based Primer—Sure Thing for Casino's Rooftop Pool," *Title World*, Sep./Oct. 1990.
G.H. Brevoort, "Current Trends and Issues in Railcar Painting and Lining", *Journal of Protective Coatings and Linings*, Dec., 1991.
"Kraton Liquid™ L–1203 Polymer," Technical Bulletin, Shell Chemical Company, Feb. 1996.
"Kraton Liquid™ L–2203 Polymer," Technical Bulletin, Shell Chemical Company, Feb. 1996.

*Primary Examiner*—Rachel Gorr
*Attorney, Agent, or Firm*—Jones, O'Keefe, Egan & Peterman

[57] ABSTRACT

Polyurea elastomer systems have improved adhesion to a substrate with the use of a primer that is applied first. The primer is composed of hydrophobic, primary hydroxyl-containing compound, for example, castor oil, and an isocyanate. It is not necessary to wait for the primer to cure prior to applying of the polyurea elastomer system. The primer system is particularly useful on wet substrates, where the primer penetrates the sub-strate prior to polyurea elastomer spraying. Regardless of whether the substrate is dry or wet, adhesion is improved.

20 Claims, No Drawings

POLYUREA ELASTOMER SYSTEMS WITH IMPROVED ADHESION TO SUBSTRATES

This application is a continuation of application Ser. No. 08/869,385 filed Jun. 5, 1997, now U.S. Pat. No. 5,759,695.

FIELD OF THE INVENTION

The invention relates to aliphatic and aromatic polyurea elastomers and processes for making the same, and, in one aspect, more particularly relates to methods and compositions for making aliphatic and aromatic polyurea elastomers having improved adhesion to wet substrates via use of a special polyurethane primer which can penetrate the substrate. The polyurea systems may be applied via spray, 2-part caulk, pour, brush-on or other method,

BACKGROUND OF THE INVENTION

Spray elastomer systems are commonly recognized as coating mate-rials, with aliphatic and aromatic isocyanate spray polyurea elastomer systems being particularly useful when employed in this capacity. This two-component technology is based on an isocyanate quasi-prepolymer and an amine coreactant, often an amine resin blend.

It is further known to use spray polyurea elastomer coatings as liners on the inside of rail cars, and on surfaces such concrete, wood, etc. Such coatings should be highly conformal to the surface sprayed and should have excellent adhesion to the surface for the lifetime of the coating. Increasingly strict environmental regulations continue to reduce the volatile organic compound (VOC) emissions permitted during the application of such coatings. These requirements have forced the coatings to have higher solids and lower solvent contents and/or be entirely water-based systems.

The following excerpt from G. H. Brevoort, "Current Trends and Issues in Railcar Painting and Lining," *Journal of Protective Coatings and Linings,* December, 1991, is instructive.

"Without a doubt, the driving force in the past decade to develop high solids, improved protective coatings and linings with reduced VOCs has come from The Clean Air Act and its amendments.

"Some residual benefits accrue from the use of high solids, VOC-conformant coatings and linings. For example, the number of gallons required is fewer, which results in fewer containers to ship, handle, open, apply and dispose of. While the price per gallon is higher, the contents per container are greater and go further so that fewer gallons are required. Much less sol-vent is being packaged, shipped and emitted. Often, the actual material cost for a job is reduced with more concentrated, high-solids products. Most important, many in the industry, includ-ing individual users, are being environmentally responsible.

"It is not easy to formulate high solids, VOC-conformant coatings and linings. Solvents are not just removed and replaced with more solids. Among the problems encountered are maintaining suspension of the mixed products (non-settling), main-training their application and handling characteristics, producing coatings with the ability to build adequate drying and recoating times for practical use. Leveling of the applied coating film to create a smooth appearance has been particularly difficult to achieve."

One advantage of spray polyurea technology is that no foaming is noted even if the elastomer system is applied to a wet substrate. However, in some cases the moisture acts as a barrier to mechanical/chemical adhe-sion. There are commercially available water emulsifiable isocyanates used as substrate primers for spray elastomer systems. For wet substrates, these primers have poor penetration properties, giving poor elastomer coating system adhesion and possible foaming.

There is thus a continuing need to develop new systems to address the varied requirements of spray polyurea coatings. Various known poly-urea systems have been employed which address some of these parameters.

For example, U.S. Pat. No. 5,266,671 to Dudley J. Primeaux, II of Huntsman Petrochemical Corporation describes a spray polyurea elasto-mer which exhibits improved resistance to abrasion. The elastomer in-cludes an isocyanate, an amine terminated polyoxyalkylene polyol, a chain extender and a chemically sized filler material. The isocyanate is preferably a quasi-prepolymer of an isocyanate and a material selected from at least one polyol, a high molecular weight polyoxyalkyleneamine or a combination thereof. A method for making a spray polyurea elastomer which is substantially resistant to abrasion is also disclosed.

Spray polyurea elastomers made from an (A) component and a (B) component, where the (A) component has a quasi-prepolymer made from an isocyanate and an active hydrogen-containing material, such as a poly-oxyalkylenepolyamine, is described in U.S. Pat. No. 5,442,034 to Dudley J. Primeaux, II of Huntsman Petrochemical Corporation. The (B) component includes an amine resin, such as an amine-terminated polyoxyalkylene polyol which may be the same or different from the polyoxyalkylene poly-amine of the quasi-prepolymer. The viscosity of the (A) component is reduced by the inclusion of an organic, alkylene carbonate, such as ethyl-ene carbonate, propylene carbonate, butylene carbonate, dimethyl carbonate and the like. The alkylene carbonate also serves as a compatibilizer between the two components, thus giving an improved mix of the system.

SUMMARY OF THE INVENTION

Accordingly, it is an object of the present invention to provide a polyurea elastomer system, which can be applied via spraying or other-wise, which can be directly applied to a wet substrate with little or no foaming.

It is another object of the present invention to provide a polyurea elastomer system which has excellent adhesion to a substrate over which it is applied, even if the substrate is wet.

Another object of the invention is to provide a polyurea elastomer system where the polyurea elastomer may be applied over a primer even when the primer is not completely cured.

In carrying out these and other objects of the invention, there is provided, in one form, a polyurea elastomer system having a primer, where the primer contains a water emulsifiable isocyanate, and a hydro-phobic, primary hydroxyl-containing compound. The system also employs a polyurea elastomer which contains a quasi-prepolymer of an isocyanate, and an active hydrogen-containing material; at least one amine resin; and at least one amine-terminated chain extender.

DETAILED DESCRIPTION OF THE INVENTION

It has been discovered that by utilizing the a water emulsifiable isocyanate, and by using castor oil instead of water, that a primer system with good penetration to the wet substrate can be realized. Even prior to cure of the primer, a fast cure spray polyurea elastomer system can be applied, thus giving a complete elastomer system with excellent adhesion to wet substrates. Indeed, the primer may be immediately coated with the spray polyurea elastomer. Any residual moisture would not cause any foaming problems with the spray polyurea elastomer.

In one embodiment, the primer is prepared such than an excess of isocyanate groups would be present. This would permit an actual chemical bond between the primer and the spray polyurea elastomer. Without be-ing bound by any particular theory, the castor oil appears to allow the isocyanate to penetrate through the moisture into the substrate before curing.

The polyurea spray elastomer part of the system, in one embodi-ment of the invention, may be prepared by mixing an isocyanate compo-nent with a resin blend component, a blend of polyoxyalkylene diamines and/or triamines and amine-terminated chain extenders, in high pressure impingement mix spray equipment and can be directly applied to a primed substrate. The inventive polyurea elastomer system is expected to have excellent flexibility and elongation. Superior abrasion and impact resistance are also anticipated advantages of the system.

The polyurea spray elastomer systems of this invention contain no solvents and thus have little or no VOCs. They are thus considered 100% solids systems to comply with VOC requirements.

Polyurea spray systems cure rapidly even under low ambient tem-perature conditions. Their fast reactivity additionally allows for uniform coating and film build over textured substrates. Polyurea systems further remain flexible over weld seams with no cracking.

Substrates for which the polyurea elastomer systems of the inven-tion are suitable include, but are not limited to, concrete, wood, metal, asphalt, plaster, tile, mortar, grout, brick, and the like, in short, any hard, porous surface.

Primer

The primer of this invention is produced by combining or mixing a primary hydroxyl-containing compound with an isocyanate. In one embodiment of the invention, the volume ratio of water emulsifiable isocya-nate to primary hydroxyl-containing compound ranges from about 1.5:1 to about 1:1.5, preferably from about 1.25:1 to about 1:1.25, where a volume ratio of about 1:1 is most preferred. After the two components are mixed, there may be a slight exotherm as the hydroxyl groups along the hydroxyl-containing compound backbones react with the—NCO groups of the iso-cyanate. As noted, in one embodiment of the invention, an excess of isocyanate groups in the primer is preferred to allow chemical bonding between the primer and the substrate. It is apparent that the reaction product of the primary hydroxyl-containing compound and the water emulsifiable isocyanate is a polyurethane.

Suitable primary hydroxyl-containing compounds include, but are not limited to castor oil, and copolymers of ethylene and butylene which have one or two hydroxyl groups. Examples of the latter include, but are not limited to KRATON LIQUID™ L-1203 and L-2203 polymers, both of which are available from Shell Chemical Company. The L-1203 polymer is a low viscosity mono-ol which is a poly(ethylene/butylene) polymer con-taining a terminal aliphatic primary hydroxyl group on one end. L-2203 is a "diol" polymer containing two terminal, aliphatic, primary, hydroxyl end groups, with a poly(ethylene/butylene) backbone. Castor oil, in one non-limiting embodiment, is believed to contain molecules between about 250 and 4,000 average molecular weight (100 to 2,000 average equivalent weight). It has been discovered that polyols and other materials with higher functionality do not work as well as castor oil or poly(ethylene/bu-tylene) copolymers having only one or two hydroxyl groups. The hydrox-yl-containing compound should be hydrophobic, so that it will work well in wet applications. Conventional polyether-based polyols would tend to pull in moisture from the wet substrate.

Suitable water emulsifiable isocyanates in the primer include, but are not limited to RUBINATE® 9259 diisocyanate, which is a water emulsifiable diphenylmethane diisocyanate with an average functionality of 2.7. This is a polymeric isocyanate (MDI) which has been chemically modified to be readily dispersible in water without the use of surfactants. Thus, suitable water emulsifiable isocyanates are those which have at least one isocyanate group and which has been chemically modified to be readily dispers-ible in water without the use of surfactants.

It will also be appreciated that while one embodiment of the inven-tion anticipates an absence of water in the primer, some water could be included in the primer within the scope of this invention. The primer formulation is explicitly absent of an amine-terminated chain extender.

The primer system of the invention may also incorporated optional ingredients. JEFFSOL™ PC propylene carbonate, available from Hunts-man Petrochemical Corporation, may also be used to help lower the viscosity of the primer system for improved penetration. For low temper-ature applications, e.g. freezer floor coatings or repairs, a catalyst could also be employed to help promote the reaction, such as JEFFCAT™ DME, di-methylethanolamine available from Huntsman Petrochemical Corpora-tion, or other known, conventional polyurethane catalysts.

Spray Polyurea Elastomer

The aliphatic and/or aromatic spray polyurea elastomer system of the present invention typically includes an isocyanate, which may be an aliphatic or aromatic isocyan-ate. Suitable aliphatic isocyanates are known to those in the art. Thus, for instance, the aliphatic isocyanates may be of the type described in U.S. Pat. No. 4,748,192, incorporated by reference herein. Accordingly, they are typically aliphatic diisocyanates, and more particularly are the trimerized or the biuretic form of an aliphatic diisocy-anate, such as, hexamethylene diisocyanate; or the bifunctional monomer of the tetraalkyl xylene diisocyanate, such as tetramethyl xylene diisocya-nate. Cyclohexane diisocyanate is also to be considered a preferred aliphatic isocyanate. Other useful aliphatic polyisocyanates are described in U.S. Pat. No. 4,705,814, also incorporated by reference herein. They include aliphatic diisocyanates, for example, alkylene diisocyanates with 4 to 12 carbon atoms in the alkylene radical, such as 1,12-dodecane diisocyanate and 1,4-tetramethylene diisocy-anate. Also described are cycloaliphatic diisocya-nates, such as 1,3- and 1,4-cyclohexane diisocyanate as well as any desired mixture of these isomers; 1-isocyanato-3,3,5-trimethyl-5-isocyanatomethyl-cyclohexane (isophorone diisocyanate); 4,4'-, 2,2'- and 2,4'-dicyclohexyl-methane diisocyanate, as well as the corresponding isomer mixtures, and the like.

Aromatic isocyanates may also be employed. Suitable aromatic polyisocyanates include, but are not necessarily limited to m-phenylene diisocyanate; p-phenylene diisocy-anate; polymethylene polyphenylene diisocyanate ; 2,4-toluene diisocyanate; 2,6-toluene diisocyanate; dianisi-dine diisocyanate; bitolylene diisocyanate; naphthalene-1,4- diisocyanate; diphenylene 4,4'-diisocyanate and the like. Suitable aliphatic/aromatic diisocyanates, include, but are not necessarily limited to xylylene-1,3-diiso-cyanate; bis(4-isocyanatophenyl)methane; bis(3-methyl4-isocyanatophenyl)methane; and 4,4'-diphenylpropane diisocyanate. The aforestated isocyanates can be used alone or in combination. In one embodiment of the invention, aromatic isocyanates are preferred.

In the practice of the present invention, it is expected that the iso-cyanate will be at least partially reacted with an active hydrogen-contain-ing material, in most cases, to form a quasi-prepolymer, although this is not an absolute requirement. A quasi-prepolymer is highly preferred to maintain the 1:1 volume ratio processing with respect to development of the elastomer properties. If a quasi-prepolymer of relatively high viscosity is used, an alkylene carbonate may be used as a reactive diluent which lowers the viscosity of the quasi-prepolymer.

The active hydrogen-containing materials may include, but are not necessarily limited to polyols, high molecular weight polyoxyalkylene-amine, also described herein as amine-terminated polyethers, or a combi-nation thereof.

The polyols include, but are not limited to, polyether polyols, poly-ester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethyl-ene oxide, propylene oxide, butylene oxide or mixtures of propylene oxide, butylene oxide and/or ethylene oxide. Other high molecular weight poly-ols which may be useful in this invention are polyesters of hydroxyl-terminated rubbers, e.g., hydroxyl-terminated polybutadiene. Hydroxyl-terminated quasi-prepolymers of polyols and isocyanates are also useful in this invention.

Especially preferred are amine-terminated polyether polyols, includ-ing primary and secondary amine-terminated polyether polyols of greater than 1,500 average molecular weight having from about 2 to about 6 functionality, preferably from about 2 to about 3, and an amine equivalent weight of from about 750 to about 4,000. Mixtures of amine-terminated polyethers may be used. In a preferred embodiment, the amine-terminated polyethers have an average molecular weight of at least about 2,500. These materials may be made by various methods known in the art.

The amine-terminated polyether resins useful in this invention, for example, are polyether resins made from an appropriate initiator to which lower alkylene oxides, such as ethylene oxide, propylene oxide, butylene oxide or mixtures thereof, are added with the resulting hydroxyl-terminat-ed polyol then being aminated. When two or more oxides are used, they may be present as random mixtures or as blocks of one or the other poly-ether. In the amination step, it is highly desirable that the terminal hy-droxyl groups in the polyol be essentially all secondary hydroxyl groups for ease of amination. Normally, the amination step does not completely re-place all of the hydroxyl groups. However, the majority of hydroxyl groups are replaced by amine groups. Therefore, in a preferred embodiment, the amine-terminated polyether resins useful in this invention have greater than 50 percent of their active hydrogens in the form of amine hydrogens. If ethylene oxide is used, it is desirable to cap the hydroxyl-terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which are incorporated by reference herein.

In the practice of this invention, a single high molecular weight amine-terminated polyol may be used. Also, mixtures of high molecular weight amine-terminated polyols, such as mixtures of di- and trifunction-al materials and/or different molecular weight or different chemical composition materials, may be used.

Also, high molecular weight amine-terminated polyethers or simply polyether amines are included within the scope of our invention and may be used alone or in combination with the aforestated polyols. The term "high molecular weight" is intended to include polyether amines having a molecular weight of at least about 2000. Particularly preferred are the JEFFAMINE® series of polyether amines available from Huntsman Petrochemical Corporation; they include JEFFAMINE D-2000, JEFFAMINE D-4000, JEFFAMINE T-3000 and JEFFAMINE T-5000.

As noted, the spray polyurea elastomer system of this invention may include an organic alkylene carbonate, as defined in U.S. Pat. No. 5,442,034, incorporated by reference herein. As noted therein, in a particu-lar embodiment of the invention, the alkylene carbonates are preferably chosen from the group of ethylene carbonate, propylene carbonate, butyl-ene carbonate and dimethyl carbonate.

It will be appreciated that in one embodiment of the invention, the portion of the spray polyurea elastomer system containing the quasi-pre-polymer of an isocyanate and an active hydrogen-containing material is termed the (A) component, whereas the portion of the spray polyurea elastomer system containing the amine resin may be referred to as the (B) component. In one embodiment of the invention, the proportion of alkyl-ene carbonate in the (A) component ranges from about 1 to about 20 per-cent, preferably from about 5 to 15 percent. These percentages are based on 100 volume parts in the (A) component. The use of the alkylene carbonate reduces the viscosity of the system, particularly the (A) component it re-sides in prior to mixing. The alkylene carbonate also allows slower effec-tive reactivities in spray polyurea elastomer systems, improved properties and surface characteristics (flowability) and improved adhesion to the surfaces on which the elastomer is sprayed.

The polyurea elastomer systems may also include amine-terminat-ed chain extenders in the formulation, which may preferably be placed within the (B) component. Suitable chain extenders include, but are not necessarily limited to, those aliphatic and cycloaliphatic diamine chain extenders mentioned in U.S. Pat. Nos. 5,162,388 and 5,480,955, incorporated herein by reference. Aromatic diamine chain extenders may also be useful, such as those described in U.S. Pat. No. 5,317,076, incorporated herein by reference. In one embodiment of the invention, aromatic chain extenders are preferred. The amount of amine-terminated chain extender in the total spray polyurea elastomer system of this invention may range from about 10 pbw to about 22.5 pbw in one embodiment; preferably from about 10 pbw to about 20 pbw; and most preferably from about 12.5 pbw to about 20 pbw.

It has further been discovered that the complete polyurea spray elastomer system also includes brush-applying the primer as well as spray application thereof. As noted, the primer is applied to the substrate first, but it is not necessary that the primer completely cure, or even cure very much before the polyurea elastomer formulation is sprayed over the primer. Indeed, the polyurea formulation may be sprayed immediately after the primer is applied.

It should be noted, however, that the invention is not limited to use with polyurea elastomers that are applied by spraying. For example, polyurea elastomers may be applied as part of a 2-part caulk system or a pour system or other system within the scope of this invention.

Other conventional formulation ingredients may be employed in the spray polyurea elastomers of this invention, such as, for example, foam stabilizers, also known as silicone oils or emulsifiers. The foam stabilizers may be an organic silane or siloxane. For example, compounds may be used having the formula:

$$RSi[O-(R_2SiO)_n-(oxyalkylene)_mR]_3$$

where R is an alkyl group containing from 1 to 4 carbon atoms; n is an integer of from 4 to 8; m is an integer of from 20 to 40; and the oxyalkylene groups are derived from propylene oxide and ethylene oxide. See, for ex-ample, U.S. Pat. No. 3,194,773, incorporated by reference herein.

Pigments, for example titanium dioxide, may be incorporated in the elastomer system to impart color properties to the elastomer. Typically, such pigments are added with the amine resin, for example, in the (B) component.

Reinforcing materials, if desired, useful in the practice of the inven-tion are known to those skilled in the art. For example, chopped or milled glass fibers, chopped or milled carbon fibers and/or mineral fibers are useful.

In one embodiment of the invention, the following broad and pre-ferred ranges for the essential components of the spray polyurea elastomer may be used. All proportions below are expressed as pbw.

| Component | Broad proportions | Preferred proportions | Most preferred proportions |
|---|---|---|---|
| Quasi-prepolymer, pbw | 30–70 | 40–60 | 45–55 |
| Amine resin blend, pbw | 70–30 | 60–40 | 55–45 |
| Amine chain extender | 20–45 | 20–40 | 25–40 |

Post curing of the polyurea elastomer is optional. Post curing will improve some elastomeric properties, such as heat sag. Employment of post curing depends on the desired properties of the end product. The (A) component and the (B) component of the present spray polyurea elasto-mer system are combined or mixed under high pressure; most preferably, they are impingement mixed directly in the high pressure spray equipment itself. In particular, a first and second pressurized stream of compo-nents, such as components (A) and (B), respectively, are delivered from separate chambers of the proportioner and are impacted or impinged upon each other at high velocity to effectuate an intimate mixing of the compo-nents and, thus, the formulation of the elastomer system, which is then coated onto the desired substrate via the spray gun.

In one embodiment of the invention, the volumetric ratio of the (A) component to the (B) component is generally from about 30 to 70 percent to about 70 to 30 percent. Preferably, component (A) and compo-nent (B) are employed in a 1:1 volumetric ratio. Advantageously, the components of the spray polyurea system react to form the polyurea elastomer without the aid of a catalyst.

The following Examples are provided to further illustrate the preferred embodiments of the present invention, but should not be construed as limiting the invention in any way.

General Procedure for Polyurea Spray Elastomer

The polyurea spray elastomers are prepared from high pressure, high temperature impingement mixing of a resin blend and an isocyanate component. The isocyanate com-ponent is typically an isocyanate quasi-prepolymer of a modified methylene diisocyanate and a high molecular weight polyether polyol (either a diol or a triol). Other isocyanate mono-mers may be blended in as well as reactive diluents.

The resin blend is simply a blend of polyoxyalkylene diamines and/or triamines and amine-terminated aromatic chain extenders. Pigments, adhesion promoters (the func-tional alkoxy silanes), UV stabil-izers and antioxidants, as well as dispersion additives, may also be includ-ed.

Primer Information

Water Emulsifiable Isocyanate

PBA 2259 product (now referred to as RUBINATE® 9259 from ICI Polyurethanes) is an emulsifiable diphenyl-methane diisocyanate that has been chemically modified so as to be readily dispersible in water. Typical properties are as follows:

| | |
|---|---|
| Isocyanate equivalent weight | 142 |
| NCO content, % | 29.5 |
| Functionality | 2.7 |
| Specific gravity at 25° C. | 1.24 |

Castor Oil

Castor oil #1 was obtained from United Catalysts Inc. This product is the glyceryl tri-ester of ricinoleic acid (also known as hydroxyoleic acid or 12-hydroxy-cis-9-octadecenoic acid), non-USP quality. Typical properties are as follows:

| | |
|---|---|
| Hydroxyl value, mg KOH/gm | 164 |
| Specific gravity at 25° C. | 0.959 |

Typical applications for castor oil are in inks, pigments and dyes, lubricants and penetrants and coating plasticizers.

Primer Preparation

For the examples disclosed herein, the primer system was prepared as follows: equal volumes of the RUBINATE 9259 and Castor Oil #1 were mixed for approximately 2 minutes. A cloudy liquid resulted. After approximately 15 minutes, a clear, amber liquid resulted. Within 30 minutes, a slight exotherm was noted and the mixture began to increase in viscos-ity.

For these Examples, the primer was prepared and applied to the sub-strate within 5 to 10 minutes. For purposes of simplicity, the primer of the Examples will be referred to as "Primer A", prepared as described above and in Example I. In each Example, the primer was brush-applied to the substrate.

In commercial, practical application, the primer could be applied by use of plural component spray equipment at a 1:1 volume ratio, RUBI-NATE 9259:Castor Oil #1.

Spray Polyurea Elastomer Systems

In each Example, a spray polyurea elastomer system was used to evaluate the effect of the primer on substrate adhesion. Both an aromatic and an aliphatic spray polyurea elastomer were evaluated. The systems are described below in Table A. All proportions are expressed as pbw.

TABLE A

Spray Polyurea Elastomers

| Isocyanate quasi-prepolymer | Polyurea Spray System A Aromatic | Polyurea Spray System B Aliphatic |
|---|---|---|
| RUBINATE ® 9015 | 100 | — |
| m-TMXDI ® | — | 50 |
| JEFFAMINE ® D-2000 | — | 50 |
| Resin blends | | |
| JEFFAMINE D-2000 | 70 | 41.2 |
| JEFFAMINE T-5000 | — | 27.5 |
| ETHACURE ® 100 | 30 | — |
| Amine XT A110 | — | 22.3 |
| TiPure ® R-900 | — | 4.0 |
| Processing | | |
| INDEX | 1.05 | 1.05 |
| Iso/Res volume ratio | 1.00 | 1.00 |
| "Effective" gel time, sec. | 2.0 | 6.0 |
| Elastomer Physical Properties | | |
| Tensile strength, psi | 2415 | 1035 |
| Elongation, % | 230 | 565 |
| Tear strength, pli | 440 | 325 |
| Shore D Hardness | 48 | 42 |
| 100% Modulus, psi | 1645 | 710 |
| 300% Modulus, psi | — | 825 |

For the purpose of this description, these formulations will be referred to as "Polyurea Spray System A" for the aromatic isocyanate-based formulation and "Polyurea Spray System B" for the aliphatic isocyanate-based formulation.

Spray Equipment

For application of the spray polyurea elastomer system, a GUSMER Marksman® and an H-2000 (H-3500 upgrade) were used, fitted with a GUS-MER GX-7 400 series impingement mix spray guns. System processing was done at 3000 psi output pressure, 160° F. line temperature and system out-put of approximately 9.0 lbs/min (1.1 gals/min).

EXAMPLE I

Equal volume amounts of RUBINATE® 9259 and Castor Oil #1 were mixed for approximately 30 seconds using a wooden spatula. This primer system was then applied by brush to samples of dry and "wet" concrete. For the "wet" concrete, a sample of dry concrete was immersed in water for 24 hours. After approximately 30 minutes, the primer was becoming slightly tacky. For both the dry and "wet" concrete, the primer showed excellent penetration into the substrate. Very slight foaming was noted after 1 hour on the "wet" concrete sample.

After 24 hours, the primer was tack free. The primed samples of concrete were then coated with the aromatic spray polyurea elastomer, "Polyurea Spray System A", mentioned previously, at a thickness of approximately 65 mils. No apparent foaming was noted in the spray poly-urea elastomer. Using an Elcometer and ASTM D-4541 "Pull-Off Strength of Coating Using Portable Adhesion Tests" procedure, coating adhesion to the substrate was determined. The results are given in Table I.

TABLE I

Example I - Application of Inventive System to Concrete

| | |
|---|---|
| Dry concrete, psi | 900 |
| Concrete Substrate Failure | 100% Failure |
| Wet concrete, psi | 350 |
| Concrete Substrate Failure | 100% Failure |

That is, failure was not due to adhesion failure, but due to structural failure of the concrete.

EXAMPLES II & III

The next Examples used the same primer as Example I (Primer A). The primer was also brush applied to the concrete samples. Prior to any treatment, the concrete samples were sand blasted to remove any dust and dirt that may be present. Concrete samples were also soaked in water for a period of 24 hours for the "wet" concrete samples. For the "wet" concrete, the concrete samples were placed in standing water after application of the primer and/or spray polyurea elastomer for a period of 24 hours before adhesion testing. For these Examples, "Polyurea Spray System A" was applied (65 mils thick) at varying times after application of the primer to the concrete substrates. These times ranged from immediately after the primer was applied to 15 minutes, 30 minutes, 1 hour, and 24 hours. No foaming of the aromatic polyurea elastomer system was noted when applied to any of the "wet" concrete samples. The Elcometer adhesion values are given in Table II.

TABLE II

Application of the Inventive System to Concrete

| Primer/Elastomer | Example II Dry Concrete | Example III Wet Concrete |
|---|---|---|
| No primer | 310 psi | <200 psi |
| Immediate application of elastomer | >1000 psi | 400 psi |
| 15 minute wait | >1000 psi | 410 psi |
| 30 minute wait | 935 psi | 425 psi |
| 1 hour wait | 775 psi | 460 psi |
| 24 hour wait | 800 psi | 450 psi |

100% substrate failure was noted in all samples except for the "wet", un-primed concrete. For this sample, the water formed a barrier to mechanical adhesion.

EXAMPLES IV & V

The same procedure used in Examples II and III was used for Examples IV and V, except that 0.5" Glas-Crete® Cement Board was used in place of the concrete. In addition to Elcometer adhesion, 90° peel tests were also performed. No foaming was noted in the "Polyurea Spray System A" when applied to any of the "wet" Glas-Crete Cement Board samples. The aromatic spray polyurea elastomer system was applied at approximately 65 mils thickness. Adhesion values are given in Table III.

TABLE III

Application of the Inventive System to Glas-Crete

| Primer/elastomer | Example IV Dry Glas-Crete | | Example V "Wet" Glas-Crete | |
|---|---|---|---|---|
| | Elcometer | 90° Peel | Elcometer | 90° Peel |
| None | 325 psi | 6.2 pli | 0 psi | 1.8 pli |
| Immediate appln. of elastomer | 420 psi | 15.6 pli | 150 psi | 5.5 pli |
| 15 min. wait | 425 psi | 17.3 pli | 170 psi | 3.4 pli |
| 30 min. wait | 325 psi | 12.9 pli | 150 psi | 6.2 pli |
| 1 hour wait | 390 psi | 35.3 pli | 180 psi | 4.7 pli |
| 24 hour wait | 390 psi | 11.3 pli | 180 psi | 4.8 pli |

100% substrate failure was noted in all samples except for the "wet", un-primed Glas-Crete cement board. The above adhesion values were deter-mined 24 hours after the polyurea had been applied.

Thus, the polyurea may be applied immediately to the primer with-out a cure period for the primer and achieve good adhesion. Further, it is shown that the primer does improve adhesion for the wet substrate, as well as for a dry substrate.

EXAMPLE VI

The next Example VI used the same primer system described in Examples I, II, III, IV, and V. For this Example, metal QD-36 Q-Panels were used. After application of the primer to the substrate, a period of 30 minutes elapsed before application of "Polyurea Spray System A". This elasto-mer system was applied at an average thickness of 18 mils. The primer was applied by brush. For the wet metal samples, water was applied by brush such that a water film was present on the metal surface. Both Elcometer and 90° peel adhesion values are given in Table IV.

TABLE IV

Application of the Inventive System to Metal

| Substrate, metal | Elcometer | 90° Peel |
|---|---|---|
| Dry, smooth, unprimed | <190 psi | <1.0 pli |
| Dry, smooth, primed | 200 psi | 12.0 pli |
| Dry, sand blasted, unprimed | 600 psi | 12.4 pli |
| Dry, sand blasted, primed | 1000 psi | 29.7 pli |
| Wet, sand blasted, unprimed | <100 psi | <1.0 pli |
| Wet, sand blasted, primed | 1000 psi | 32.3 pli |

For the primed, sand blasted Q-Panels, both wet and dry, cohesive failure was noted in the elastomer system.

EXAMPLE VII

Example VII used the same primer system used in the previous Examples. In Example VII, the primer was brush applied to sand blasted aluminum and Marcite® material (used in swimming pool manufacture). These primed samples were coated with "Polyurea Spray System B", the aliphatic spray polyurea elastomer system after a 30 minute wait. No foaming, blistering or delamination was noted in "Polyurea Spray System B" after application to the primer. Excellent adhesion was noted to the substrates such that cohesive failure was noted in the elastomer on the metal sample and cohesive failure was noted in the elastomer on the Marcite sample. That is, the elastomer per se came apart before substrate adhesion failure.

From the results presented above, it may be seen that the spray polyurea elastomer system of this invention finds utility in improving adhesion to wet substrates, but also improves adhesion to dry substrates. The system provides polyurea elastomer coatings quickly to increase turn-around time, since the polyurea spray elastomer may be applied immedi-ately after the primer is applied. As noted, other techniques for applying a polyurea may also be used.

Many modifications may be made in the process of this invention without departing from the spirit and scope thereof which are defined only in the appended claims. For example, one skilled in the art may dis-cover that a certain combination or proportion of ingredients may give a primer or a polyurea elastomer, or a combination thereof with particular advantages, or that certain functional castor oil/isocyanate compositions or proportions are better than others at improving adhesion.

GLOSSARY

| | |
|---|---|
| Amine XT A110 | Developmental cycloaliphatic diamine of 194 molecular weight from Huntsman Petrochem-ical Corporation used as a chain extender; used in U.S. Pat. No. 5,442,034, incorporated by reference herein. |
| ETHACURE® 100 | Diethyltoluene diamine chain extender avail-able from Albemarlem Corporation, formerly Ethyl Corp. |
| JEFFAMINE® D-2000 | A 2000 molecular weight polyoxypropylene di-amine available from Huntsman Petrochemical Corporation. |
| JEFFAMINE® T-5000 | A 5000 molecular weight polyoxypropylene tri-amine available from Huntsman Petrochemical Corporation. |
| m-TMXDI® | m-Tetramethylxylene diisocyanate from Cytec Industries (American Cyanamid). |
| RUBINATE® 9015 | An isocyanate quasi-prepolymer based on a ure-tonimine modified MDI and a high molecular weight polyether polyol. This product has an isocyanate content of 15.5%, has a 2,4'-isomer content of less than 10%, and is available from ICI Polyurethanes. |
| RUBINATE® 9259 | Water emulsifiable diphenylmethane diisocyanate available from ICI Polyurethanes. |

I claim:
1. A polyurea elastomer system comprising:
   a primer comprising a reaction product of:
      a water emulsifiable isocyanate, and
      a hydrophobic, primary hydroxyl-containing compound;
   a polyurea elastomer comprising a reaction product of:
      a quasi-prepolymer of
         an isocyanate, and
         an active hydrogen-containing material;
      at least one amine resin; and
      at least one amine-terminated chain extender.

2. The polyurea elastomer system of claim 1 where in the primer, the volume ratio of water emulsifiable isocyanate to hydrophobic, primary hydroxyl-containing compound ranges from about 1.5:1 to about 1:1.5.

3. The polyurea elastomer system of claim 1 where the primer additionally comprises propylene carbonate.

4. The polyurea elastomer system of claim 1 where in the polyurea elastomer the amine resin is an amine-terminated polyoxyalkylene polyol.

5. The polyurea elastomer of claim 1 where in the quasi-prepolymer of the polyurea elastomer the isocyanate is selected from the group of isocyanates consisting of
   aliphatic isocyanates selected from the group consisting of hexamethylene diisocyanate; a bifunctional monomer of tetraalkyl xylene diisocyanate; cyclohexane diisocyanate; 1,12-dodecane diisocyanate; 1,4-tetramethylene diisocyanate; isophorone diisocyanate; and dicyclohexylmethane diisocyanate;

aromatic isocyanates selected from the group consisting of m-phenylene diisocyanate; p-phenylene diisocyanate; polymethylene polyphenylene diisocyanate; 2,4-toluene diisocyanate; 2,6-toluene diisocyanate; dianisidine diisocyanate; bitolylene diisocyanate; naphthalene-1,4-diisocyanate; and diphenylene 4,4'-diisocyanate; and aliphatic/aromatic diisocyanates, selected from the group consisting of xylylene-1,3-diisocyanate; bis(4-isocyanatophenyl)methane; bis(3-methyl-4-isocyanatophenyl)methane; and 4,4'-diphenylpropane diisocyanate;

and mixtures thereof.

6. The polyurea elastomer of claim 1 wherein the polyurea elastomer the amine-terminated chain extender is selected from the group consisting of an aliphatic, cycloaliphatic or aromatic diamine chain extender.

7. The polyurea elastomer of claim 1 wherein the hydrophobic, primary hydroxyl-containing compound is selected from the group consisting of castor oil, and copolymers of ethylene and butylene which copolymers have from 1 to 2 primary hydroxyl groups.

8. A method for applying a polyurea elastomer coating on a substrate comprising:

applying a primer to the substrate, where the primer comprises a reaction product of:
 a water emulsifiable isocyanate, and
 a hydrophobic, primary hydroxyl-containing compound;

applying a polyurea elastomer onto the substrate bearing the primer, wherein the polyurea elastomer is formulated from:
 a quasi-prepolymer of
  an isocyanate, and
  an active hydrogen-containing material;
 at least one amine resin; and
 at least one amine-terminated chain extender.

9. The method of claim 8, further comprising wetting the substrate with water prior to applying the primer.

10. The method of claim 8 where applying the polyurea elastomer onto the substrate occurs prior to the primer being cured.

11. The method of claim 8 where the substrate is selected from the group consisting of concrete, wood, metal, asphalt, plaster, tile, mortar, grout, and brick.

12. The method of claim 8 where in applying the primer, the volume ratio of water emulsifiable isocyanate to hydrophobic, primary hydroxyl-containing compound ranges from about 1.5:1 to about 1:1.5.

13. The method of claim 8 where in applying the primer, providing propylene carbonate in the primer.

14. The method of claim 8 where in applying the polyurea elastomer, in the polyurea elastomer, the amine resin is an amine-terminated polyoxyalkylene polyol.

15. The method of claim 8 where in applying the polyurea elastomer, in the polyurea elastomer, the isocyanate is selected from the group of isocyanates consisting of aliphatic isocyanates selected from the group consisting of hexamethylene diisocyanate; a bifunctional monomer of tetraalkyl xylene diisocyanate; cyclohexane diisocyanate; 1,12-dodecane diisocyanate; 1,4-tetramethylene diisocyanate; isophorone diisocyanate; and dicyclohexylmethane diisocyanate;

aromatic isocyanates selected from the group consisting of m-phenylene diisocyanate; p-phenylene diisocyanate; polymethylene polyphenylene diisocyanate; 2,4-toluene diisocyanate; 2,6-toluene diisocyanate; dianisidine diisocyanate; bitolylene diisocyanate; naphthalene-1,4-diisocyanate; and diphenylene 4,4'-diisocyanate; and aliphatic/aromatic diisocyanates, selected from the group consisting of xylylene-1,3-diisocyanate; bis(4-isocyanatophenyl)methane; bis(3-methyl-4-isocyanatophenyl)methane; and 4,4'-diphenylpropane diisocyanate;

and mixtures thereof.

16. The method of claim 8 where in applying the polyurea elastomer, in the polyurea elastomer, the amine-terminated chain extender is selected from the group consisting of an aliphatic, cycloaliphatic or aromatic diamine chain extender.

17. The method of claim 8 where in the applying of the primer, the hydrophobic, primary hydroxyl-containing compound is selected from the group consisting of castor oil, and copolymers of ethylene and butylene which copolymers have from 1 to 2 primary hydroxyl groups.

18. A method for applying a polyurea elastomer coating on a wet substrate comprising:

applying a primer to the substrate wet with water, wherein the primer has been prepared from:
 a water emulsifiable isocyanate, and
 hydrophobic, primary hydroxyl-containing compound;
  wherein the volume ratio of water emulsifiable isocyanate to hydrophobic, primary hydroxyl-containing compound in the primer ranges from about 1.5:1 to about 1:1.5;

applying a polyurea elastomer onto the substrate bearing the primer, where the polyurea elastomer has been formulated from:
 a quasi-prepolymer of
  an isocyanate, and
  an active hydrogen-containing material;
 at least one amine resin; and
 at least one amine-terminated chain extender.

19. The method of claim 18 where applying the polyurea elastomer onto the substrate occurs prior to the primer being cured.

20. The method of claim 18 where the substrate is selected from the group consisting of concrete, wood, metal, asphalt, plaster, tile, mortar, grout, and brick.

* * * * *